United States Patent [19]
Nagahama

[11] Patent Number: 5,504,269
[45] Date of Patent: Apr. 2, 1996

[54] ELECTRONIC MUSICAL INSTRUMENT HAVING A VOICE-INPUTTING FUNCTION

[75] Inventor: Yasuo Nagahama, Hamamatsu, Japan

[73] Assignee: Yamaha Corporation, Japan

[21] Appl. No.: 221,390

[22] Filed: Mar. 31, 1994

[30] Foreign Application Priority Data

Apr. 2, 1993 [JP] Japan .................................. 5-100343

[51] Int. Cl.$^6$ .......................... G09B 15/04; G10G 1/00; G10H 7/00
[52] U.S. Cl. .................. 84/609; 84/622; 84/453; 84/477 R
[58] Field of Search .......................... 84/600, 453, 454, 84/477 R, 478, 609–614, 622–625, 649–652, 659–661

[56] References Cited

U.S. PATENT DOCUMENTS

| | | |
|---|---|---|
| 4,429,609 | 2/1984 | Warrender . |
| 4,703,681 | 11/1987 | Okamoto . |
| 5,016,515 | 5/1991 | Scott ........................................ 84/454 |

FOREIGN PATENT DOCUMENTS 1-309087  12/1989  Japan .

*Primary Examiner*—Stanley J. Witkowski
*Attorney, Agent, or Firm*—Graham & James

[57] ABSTRACT

An electronic musical instrument has a voice-inputting function. Voice information and performance information are input to the instrument. The instrument stores performance data therein. Each item of performance data stored is sequentially read out. The next item of performance data is read out when it is determined that at least one of the voice information and performance information being given agrees with each item of performance data sequentially read out. The instrument includes a plurality of operating elements for performance. Display devices are provided for the operating elements, respectively. When voice input is detected, one of the display devices, corresponding to one of the plurality of operating elements, is lighted, which corresponds to the pitch name of the detected voice. When voice input ends, the light in the display device is turned off. The instrument sequentially stores the voice information being sequentially read out in another operating mode. A player is notified of one of the plurality of elements to be operated, which corresponds to an item of the stored voice information read out. The next item of the stored voice information is caused to be read out, when the item of the stored voice information read out agrees with an item of pitch information of a musical tone for performance.

17 Claims, 14 Drawing Sheets

| FREQUENCY f(Hz) | | PITCH NAME | KEY CODE |
|---|---|---|---|
| LOWER LIMIT VALUE | UPPER LIMIT VALUE | | |
| ⋮ | ⋮ | ⋮ | ⋮ |
| 2 5 5 | 2 6 9 | C4 | 4 0 |
| 2 7 0 | 2 8 5 | C4# | 4 1 |
| 2 8 6 | 3 0 2 | D4 | 4 2 |
| ⋮ | ⋮ | ⋮ | ⋮ |

ELECTRONIC MUSICAL INSTRUMENT HAVING A VOICE-INPUTTING FUNCTION

BACKGROUND OF THE INVENTION

1. Field of the Invention

This invention relates to an electronic musical instrument having a voice-inputting function, and more particularly to an electronic musical instrument which is adapted to detect the pitch name of a voice input thereto and then perform display and control based on the detected pitch name.

2. Prior Art

Conventionally, there has been proposed an electronic musical instrument having a voice-inputting function, which includes voice input means for inputting a voice thereto, and has functions of detecting the pitch of the input voice, determining a pitch name corresponding to the detected pitch to indicate the pitch name and/or a note therefor on a display, or lighting display devices, such as light-emitting diodes (LED's), provided, respectively, for performance-operating elements, such as keys of a keyboard. Further, there has also been proposed an electronic musical instrument which has a guide function of inhibiting generation of only musical tones for a performance part selected by the player, subjecting the other parts to automatic performance, and at the same time displaying performance data of the performance part played by the player on LED's, when the player plays automatic performance by reading stored data of pieces of music from a memory. Electronic musical instruments having the above-mentioned guide function include a type which is adapted to light corresponding ones of LED's provided, respectively, for performance-operating elements, based on data of a piece of music selected for performance, and at the same time holds the automatic performance on standby until the player operates performance-operating elements corresponding to the lighted LED's.

However, the first-mentioned conventional electronic musical instrument, which determines a pitch name according to the pitch of an input voice and lights a corresponding LED, is not controlled such that when there is no inputting of a voice for a certain time period, this is detected and then the corresponding LED indicating the pitch name is turned off. As a result, when no voice continues to be input, an indication caused by previous inputting of a voice continues to be displayed to give a false impression that voices continue to be input to the instrument, causing a sense of incoherency. Further, the second-mentioned conventional electronic musical instrument having the guide function has a disadvantage that the automatic performance frequency stops or the standby mode in which the automatic performance is interrupted lasts for a long time, when an unskilled player plays the instrument, which prevents the player from enjoying playing the instrument.

Further, the conventional electronic musical instruments could not provide means for helping a player practice giving performance on a piece of music which he can sing but cannot play thereon.

SUMMARY OF THE INVENTION

It is a first object of the invention to provide an electronic musical instrument which is free from frequent stoppage of the automatic performance and prolonging of the standby mode, to thereby enable the player to enjoy giving performance.

It is a second object of the invention to provide an electronic musical instrument which is capable of displaying only a state in which voice data is actually input, to thereby prevent a sense of incoherency from being caused.

It is a third object of the invention to provide an electronic musical instrument which is capable of helping a player practice playing a piece of music thereon which he can sing but cannot play thereon.

To attain the first object, according to a first aspect of the invention, there is provided an electronic musical instrument having a voice-inputting function, comprising:

voice information-inputting means for inputting information of a voice;

performance information-inputting means for inputting information of performance being given;

performance data-storing means for storing data for performance;

readout means for sequentially reading out each item of the data for performance stored in the performance data-storing means;

comparing means for comparing at least one of the information of the voice input by the voice information-inputting means and the information of performance input by the performance information-inputting means with the each of item of data for performance read out by the readout means from the performance data-storing means; and readout-directing means for directing the readout means to read out a next item of the data for performance, when the comparing means determines that the at least one of the information of the voice and the information of performance agrees with the item of data for performance read out by the readout means.

According to this aspect of the invention, the electronic musical instrument has the readout-directing means for directing the readout means to read out a next item of the data for performance not only when it is determined that the information of performance agrees with the item of data for performance read out, but also when it is determined that the information of the voice agrees with same. Therefore, even an unskilled player can enjoy giving performance, since he can input performance information via the voice information-inputting means when he cannot instantly input the performance information via the performance information-inputting means, thereby preventing frequent stoppage of the automatic performance, and prolonging of the standby state.

Preferably, the electronic musical instrument includes a plurality of display means each of which is lighted (i.e., turned on) based on the item of data for performance read out by the readout means, and is put out (i.e., turned off) when the comparing means determines that the at least one of the information of the voice and the information of performance corresponding to the each of the plurality of display means agrees with information of the item of data read out by the readout means and corresponding to the each of the plurality of display means.

Preferably, the voice information-inputting means includes voice-inputting means and pitch information-determining means for determining pitch information corresponding to the voice, based on the voice input by the voice-inputting means.

Further preferably, the pitch information-determining means determines the pitch information by use of a table formed by predetermined ranges of fundamental frequencies of voices and pitch names respectively corresponding thereto.

Still more preferably, the electronic musical instrument includes pitch information-storing means for storing the pitch information, with the performance data-storing means storing data of a plurality of pieces of music for performance. The pitch information-determining means detects identity between a piece of music being given by the player and one of the plurality of pieces of music stored in the performance data-storing means, and determines the pitch information, based on data of the one of plurality of pieces of music on which identity with the piece of music being given by the player has been detected.

Even more preferably, the pitch information-determining means widens a predetermined range of a fundamental frequency of each voice corresponding to one of the pitch information, based on the data for performance of the one of plurality of pieces of music on which identity with the piece of music being given by the player has been detected.

To attain the second object, according to a second aspect of the invention, there is provided an electronic musical instrument having a voice-inputting function, comprising:

voice-inputting means for inputting a voice;

performance information-inputting means for inputting information of performance being given, the performance information-inputting means having a plurality of operating elements for performance;

display devices provided for respective ones of the plurality of operating elements of the performance information-inputting means;

determining means for determining whether or not the voice has been input by the voice-inputting means;

detecting means for detecting a pitch name of the voice input by the voice-inputting means; and control means for controlling the display devices such that when the determining means has determined that the voice has been input, one of the display devices for a corresponding one of the plurality of operating elements is lighted, which corresponds to the pitch name of the voice detected by the detecting means, and that when the determining means has determined that the voice has not been input any longer, the one of display devices lighted is put out.

According to the second aspect of the invention, the electronic musical instrument has the control means for controlling the display devices such that when it is determined that the voice in response to which a corresponding one of the display device is lighted has not been input any longer, the lighted display device is put out. Therefore, the instrument displays an actual state of inputting of the voice information, enabling the player to accurately recognize whether or not the voice information is being input, without a sense of incoherence.

Preferably, the determining means detects a peak value of the voice input by the voice-inputting means, and determines that the voice has been input, when the peak value is larger than a first predetermined reference value.

Further preferably, the determining means determines that a second voice input has occurred, when a peak value of a voice input after the determining means has determined that the voice had the peak value which was larger than the first predetermined reference value, is larger than a second predetermined reference value, and the detecting means changes the pitch name based on the second voice input.

To attain the third object, according to a third aspect of the invention, there is provided an electronic musical instrument having a voice-inputting function, comprising:

a plurality of operating elements for performance;

notifying means for notifying a player of one of the plurality of operating elements to be operated;

voice information-inputting means for inputting information of voices;

storage means for sequentially storing the information of the voices input by the voice information-inputting means thereinto;

readout means for sequentially reading out the information of voices stored in the storage means; and control means for causing the notifying means to notify the player of the one of the plurality of operating elements to be operated, which corresponds to an item of the information of the voices read out from the storage means.

According to this aspect of the invention, the player can form and store data (information of voices) for performance of any piece of music by singing it, which is then sequentially read out for notifying the player of a sequence of operating elements to be operated. Therefore, it is not necessary for the electronic musical instrument to have the data for performance stored therein in advance, helping the player practice playing any piece of music which he can sing but cannot play thereon.

Preferably, the electronic musical instrument includes changeover means for effecting changeover between a recording mode in which the information of the voices is sequentially stored into the storage means and a reproducing mode in which the information of the voices stored in the storage means is sequentially read out.

To attain the third object, according to a fourth aspect of the invention, there is provided an electronic musical instrument having a voice-inputting function, comprising:

voice information-inputting means for inputting information of voices;

storage means for sequentially storing the information of the voices input by the voice information-inputting means thereinto;

readout means for sequentially reading out the information of voices stored in the storage means;

pitch information-inputting means for inputting information of a pitch of a musical tone for performance;

comparing means for comparing an item of the information of voices read out by the readout means with an item of the information of the pitch input by the pitch information-inputting means; and control means for causing the readout means to read out a next item of the information of voices stored in the storage means, when the item of the information of the voices agrees with the item of the information of the pitch input by the pitch information-inputting means.

According to this aspect of the invention, the data (information of voices) for performance formed by singing and stored in the storage means is sequentially read out to be compared with information of a pitch (input via a performance action (e.g. depression of a key) by the player), permitting a next item of the data for performance to be read out when the comparison determines that the performance action has been properly made. This helps the player practice any piece of music which he can sing but cannot play on the musical instrument.

Preferably, the electronic musical instrument includes changeover means for effecting changeover between a recording mode in which the information of the voices is sequentially stored into the storage means and a reproducing mode in which the information of the voices stored in the storage means is sequentially read out and the information of voices newly input by the voice information inputting means is used as the information of the pitch.

The above and other objects, features and advantages of the invention will become more apparent from the following detailed description taken in conjunction with the accompanying drawings.

DETAILED DESCRIPTION

The invention will now be described in detail with reference to the drawings showing embodiments thereof.

Figure 1:
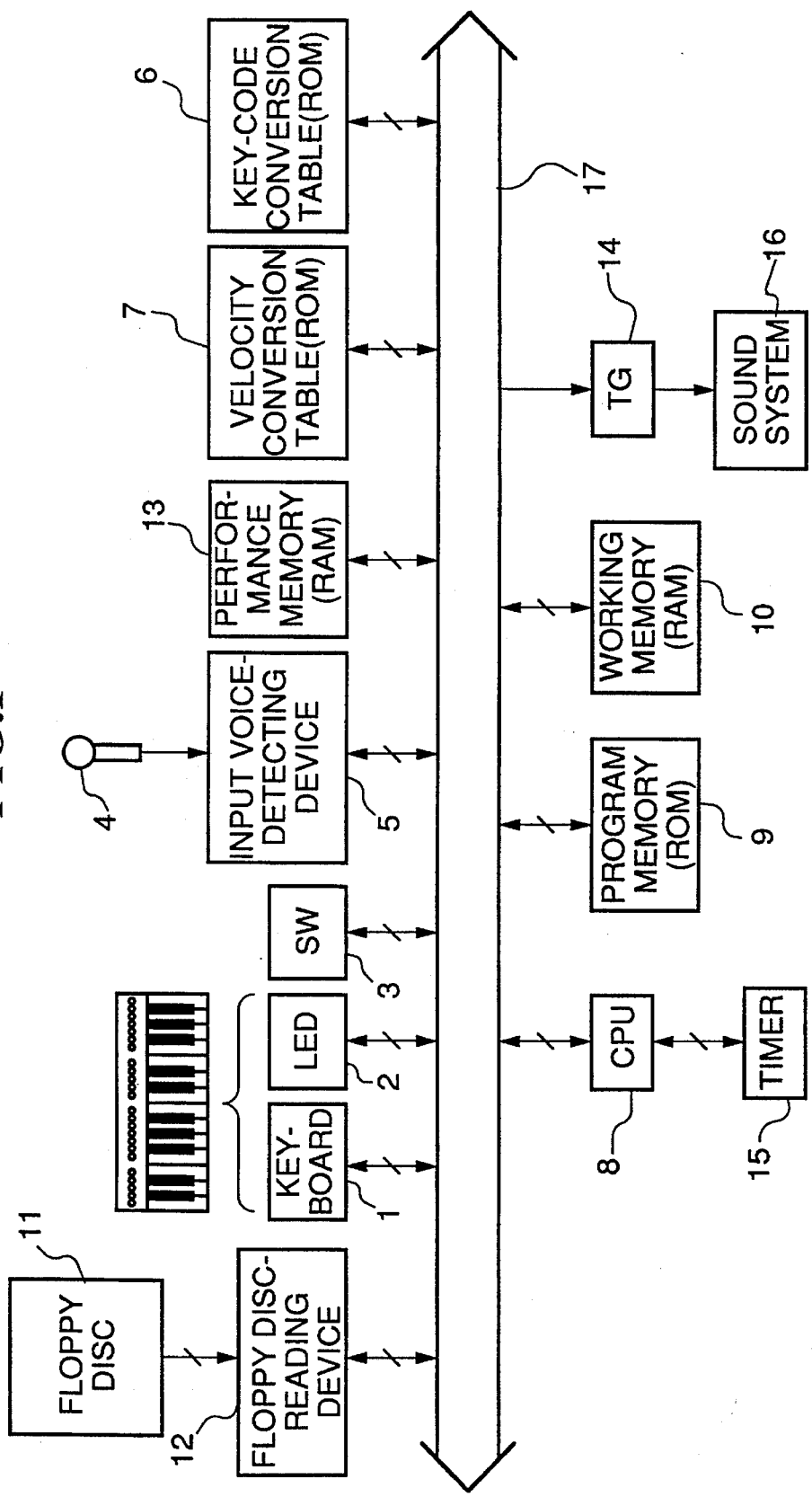
FIG. 1 is a block diagram schematically showing the whole arrangement of an electronic musical instrument having a voice-inputting function, according to first and second embodiments of the invention.

Referring first to FIG. 1, there is schematically shown the whole arrangement of an electronic musical instrument having a voice-inputting function, according to a first embodiment of the invention. As shown in the figure, the electronic musical instrument comprises a keyboard 1, an LED group formed by a plurality of LED's provided for respective keys of the keyboard 1, a switch group 3 formed by a plurality of switches for inputting various kinds of control information are input to the instrument, an input voice-detecting device 5 for detecting a voice input via a microphone 4, a key-code conversion table 6 for determining a key code corresponding to a voice detected by the input voice-detecting device 5, a velocity conversion table 7 for converting a value of breath pressure of the voice into a velocity, a central processing unit (CPU) 8 for controlling the overall operation of the electronic musical instrument, a program memory 9 storing programs executed by the CPU 8, a working memory 10 for temporarily storing results of computations and input information, a floppy disc-reading device 12 for reading data of pieces of music selected for performance from a floppy disc 11 storing data of pieces of music for performance, and a performance memory 13 for storing data of performance given by the player, and a tone generator (TG) 14 for generating musical tone signals, based on the performance by the player, performance data stored in the floppy disc 11 or the performance memory 13, etc.

The keyboard 1, the LED group 2, the switch group 3, the input voice-detecting device 5, the key-code conversion table 6, the velocity conversion table 7, the CPU 8, the program memory 9, the working memory 10, the floppy disc-reading device 12, the performance memory 13, and the tone generator 14 are connected to each other via a bus 17.

Further connected to the CPU 8 is a timer 15 for measuring a time period for timer interruption and other time periods for use in various control operations of the CPU 8. The tone generator 14 delivers its output to a sound system 16 including a loudspeaker.

Figures 2, 3:
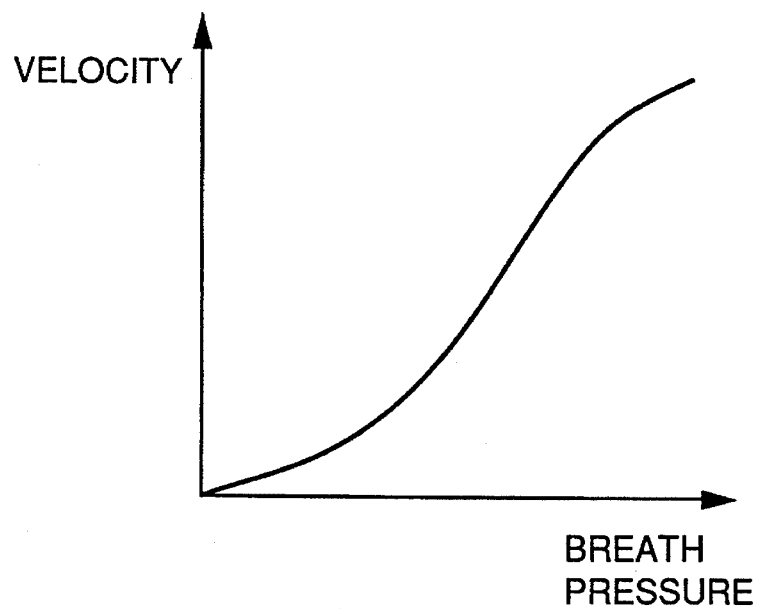
FIG. 2 is a diagram showing an example of a key code conversion table appearing in FIG. 1.
FIG. 3 is a diagram showing an example of the output characteristic of a velocity conversion table appearing in FIG. 1.

FIG. 2 shows an example of the key-code conversion table 6. When a voice of the player is detected by the input voice-detecting device 5, which determines the frequency f of the input voice, and delivers data indicative of the frequency to the CPU 8. The CPU 8 compares the frequency of the input voice and upper and lower limit values of the frequency of each pitch name set in the key-code conversion table 6 to determine the pitch name of the input voice, and at the same time determines a key code corresponding to the determined pitch name. For example, when the frequency f of the pitch voice is equal to 260 Hz, the pitch name is determined to be C4, and the corresponding key code 40.

FIG. 3 shows an example of a characteristic curve showing the characteristic of the velocity conversion table 7. As shown in FIG. 3, the table 7 is set such that the velocity value is set to larger values as the breath pressure increases, according to the characteristic curve shown in the figure. When the breath pressure of the input voice is detected, the CPU 8 determines a value of the velocity of the input voice according to the velocity conversion table 7, and delivers the determined value of the velocity to the tone generator 14.

The switch group 3 is mainly comprised of the following switches:

First, a start/stop switch controls the start/stop of a reproducing processing (hereinafter referred to as "the reproducing mode") for reproducing musical tones based on performance data from the floppy disc 11 or from the performance memory 13, or that of a recording processing (hereinafter referred to as "the recording mode") for recording performance data by storing same into the performance memory 13. Whenever the start/stop switch is depressed, the operation mode or operation of the system is reversed, i.e. one of the two modes which is selected by a recording switch, hereinafter referred to, is started for operation when the instrument has not been operating in either of the two modes, and the operation in the selected mode is stopped when it has been operating in the selected mode.

Next, the recording switch is operated to effect changeover between the recording mode and the reproducing mode. Whenever this switch is depressed, the operating mode or operation of the system is reversed, i.e. the recording mode is started when the instrument has been in the reproducing mode, and the reproducing mode is started when it has been in the recording mode. A mode-selecting switch is operated to select between a disc mode and a performance mode, and a guide switch is operated to effect changeover between a normal mode and a guide mode, both of the switches effecting changeover between the respective modes whenever they are depressed. The disc mode is an operating mode in which performance data is read from or written into the floppy disc 11, whereas the performance mode is an operating mode in which performance data is read from or written into the performance memory 3. The guide mode is an operating mode in which keys to be depressed are indicated by lighting LED's according to performance data without generating musical tones corresponding to the keys, when the performance data is read from the floppy disc 11 (hereinafter referred to as "the minus-one function"), whereas keys to be depressed are indicated by lighting LED's according to performance data and putting out the LED's in response to input data of depressed keys which have been indicated by lighting LED's or input data of a voice having a pitch corresponding to the key indicated, when the performance data is read from the performance memory 3.

Further, a music piece-selecting switch is operated to select a piece of music for performance from a plurality of pieces of music stored in the disc.

Control processings carried out by the electronic musical instrument having the voice-inputting function, constructed as above, will now be described with reference to FIG. 4 to FIG. 15 showing program routines.

Figure 4:
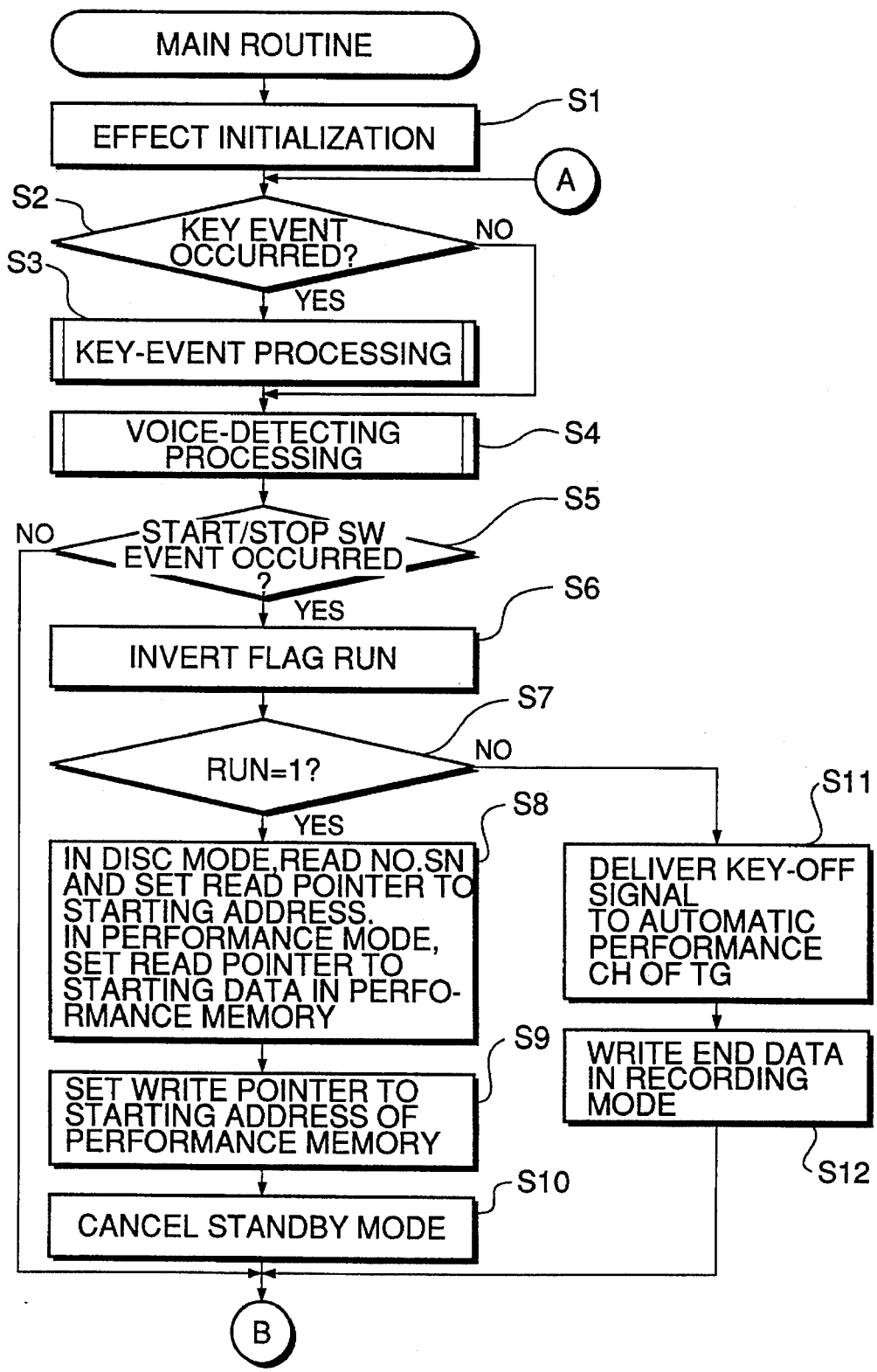
FIG. 4 is a flowchart showing part of a main routine according to the first embodiment.
Figure 5:
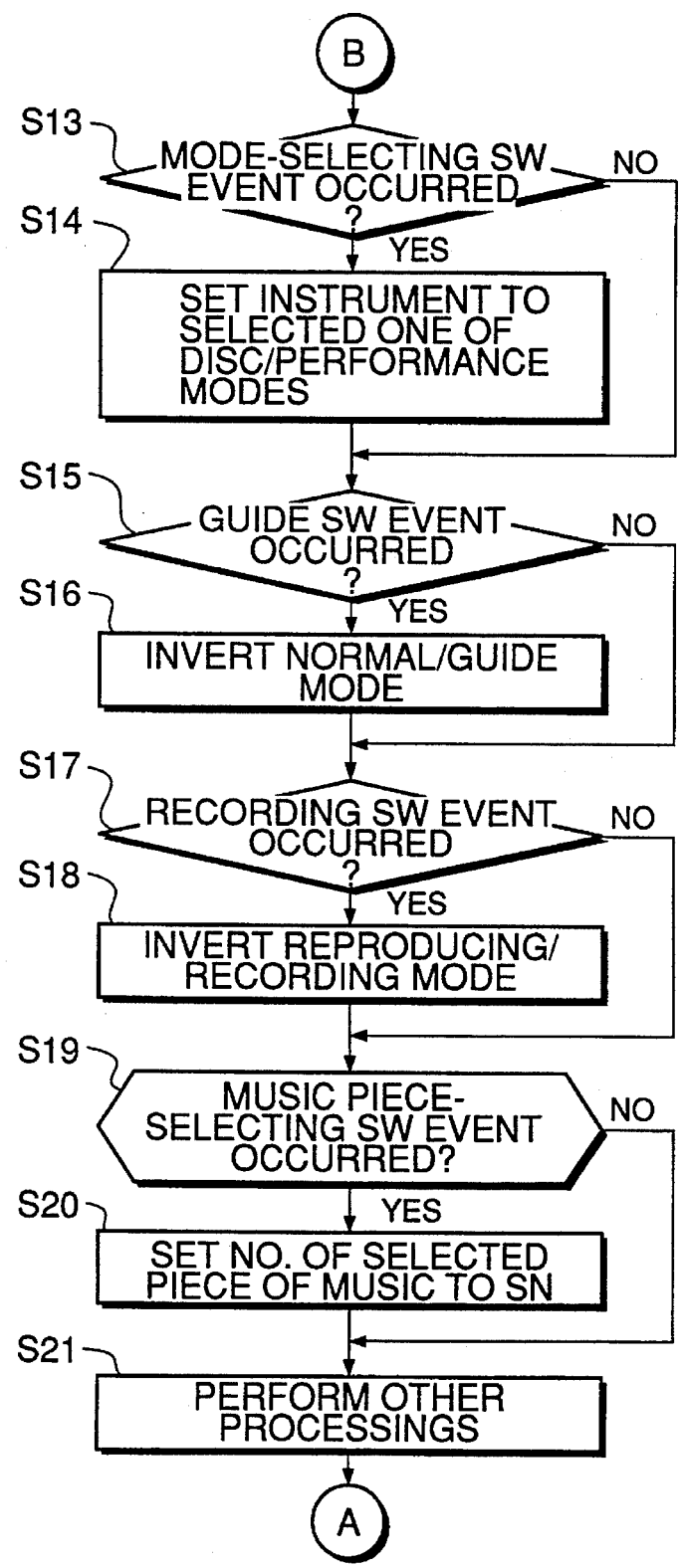
FIG. 5 is a flowchart showing a continuation of the FIG. 4 main routine.

FIG. 4 and FIG. 5 show a main routine according to the first embodiment. First, at a step S1, various control parameters are initialized, and at a step S2, it is determined whether or not a key event has occurred. If the answer to this question is affirmative (YES), i.e. if the key event has occurred, the program proceeds to a step S3, where a key-event processing, described hereinbelow, is executed, and then the program proceeds to a step S4, whereas if the answer to the question of the step S2 is negative (NO), i.e. if the key event has not occurred, the program jumps over to the step S4.

Next, at the step S4, a voice-detecting processing, described hereinbelow, is executed, and then at a step S5, it is determined whether or not the start/stop switch has been depressed. If the start/stop switch has been depressed, the program proceeds to a step S6, where a flag RUN indicating whether or not the electronic musical instrument is in operation is inverted, i.e. it is set to "1" (indicating that the instrument is in operation) if it has been equal to "0" (indicating that the instrument is not in operation) and vice versa.

At the following step S7, it is determined whether or not the flag RUN is equal to "1", i.e. whether or not the musical instrument is in operation. If the flag RUN is equal to "1", the program proceeds to a step S8, where a processing according to the disc mode or the performance mode set by the mode-selecting switch is executed. That is, when the electronic musical instrument is in the disc mode, a number allowed to a piece of music selected by the music piece-selecting switch is read in and a read pointer is set to a starting address of the piece of music, whereas when the electronic musical instrument is in the performance mode, the read pointer is set to a starting address of the performance memory 13. That is, in the present embodiment, a method is employed in which the read pointer is controlled to read out data of a piece of music starting with data pointed to by the read pointer.

Then, at a step S9, a write pointer is set to the starting address of the performance memory 13. In the present embodiment, a method is employed in which the write pointer is controlled to write data into the performance memory 13, similarly to reading data therefrom. At the following step S10, a standby mode is cancelled. In the standby mode, reading of subsequent performance data is held on standby until the player depresses a key or inputs a voice according to indication by an LED lighted based on the reproducing key-code list, to notify the player of a key to be depressed when the electronic musical instrument is in the guide mode.

On the other hand, if the answer to the question of the step S7 is negative (NO), i.e. if the flag RUN is equal to "0", a key-off signal is delivered to an automatic performance channel CH of the tone generator 14, at a step S11. Then, at a step S12, if the electronic musical instrument was in the recording mode in the immediately preceding loop, end data is written into the performance memory 13, followed by the program proceeding to a step S13.

If the answer to the question of the step S5 is negative (NO), the program jumps over to the step S13.

At the step S13, it is determined whether or not the mode-selecting switch has been depressed, i.e whether or not a mode-selecting switch event has occurred. If the answer to this question is affirmative (YES), the mode is inverted from the disk mode to the performance mode or vice versa at a step S14, to thereby select one of the disc mode and the performance mode, followed by the program proceeding to the step S15. On the other hand, if the answer to the question of the step S13 is negative (NO), the program jumps over to the step S15.

At the step S15, it is determined whether or not the guide switch has been depressed. If the answer to this question is affirmative (YES), the mode is inverted from the normal mode to the guide mode or vice versa at a step S16, thereby selecting one of the normal mode or the guide mode, and then the program proceeds to a step S17. If the answer to the question of the step S15 is negative (NO), the program jumps over to the step S17, where it is determined whether or not the recording switch has been depressed. If the answer to this question is affirmative (YES), the mode is inverted from the recording mode to the reproducing mode or vice versa at a step S18. If the answer to the question of the step S17 is negative (NO), the program proceeds to a step S19, where it is determined whether or not the music piece-selecting switch has been depressed. If the answer to this question is affirmative (YES), a number allotted to the selected piece of music is stored into a buffer SN within the working memory 10 at a step S20, and then at a step S21, other processings such as setting of tempo and setting of tone quality are executed, followed by the program returning to the step S2 to repeatedly execute the processings described above. On the other hand, if the answer to the question of the step S19 is negative (NO), the program proceeds to the step S21.

Figure 6:
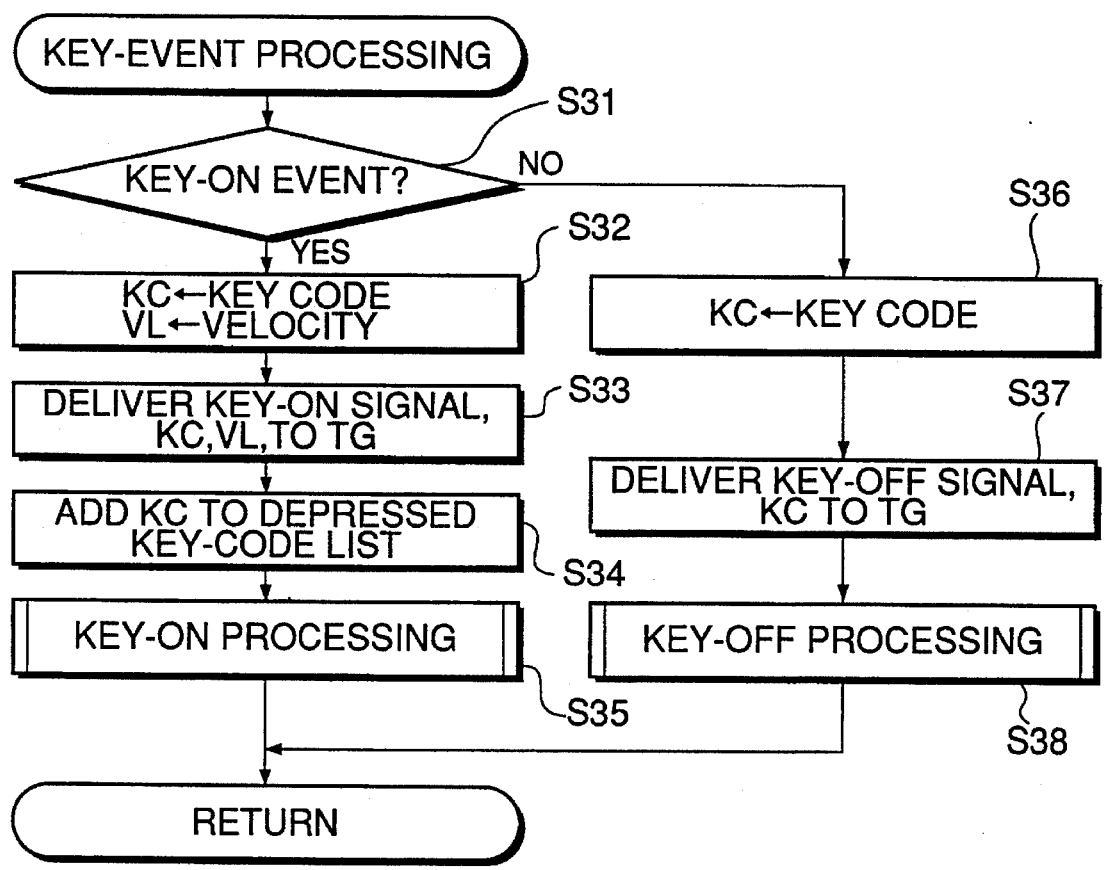
FIG. 6 is a flowchart showing a subroutine for a key-event processing executed at a step S3 of the FIG. 4 main routine.

FIG. 6 shows a subroutine for carrying out the key event processing executed at the step S3 in FIG. 4.

First, at a step S31, it is determined whether or not the key event is a key-on event. If the answer is affirmative (YES), a key code corresponding to the depressed key is stored into a buffer KC within the working memory 10, and a value of the velocity of same into a buffer VL, at a step S32. Then, at a step S33, a signal indicative of the key-on event is delivered to the tone generator 14 together with the key code KC and the velocity VL. Then, at a step S34, the contents stored in the buffer KC are added to a depressed key-code list, and then a key-on processing, described in detail hereinafter, is executed at a step S35, followed by terminating the present subroutine. The depressed key-code list is used for determining whether or not key codes selected by depressing keys agree with key codes indicated by the lighted LED's for the player's depression, when the instrument is in the guide mode, assuming that a plurality of keys are depressed at one time. More specifically, a reproducing key-code list of keys to be depressed for reproducing musical tones, prepared based on performance data read from the floppy disc 11 or the performance memory 13 is compared with the depressed key-code list prepared based information on depressed keys, to determine whether the actually depressed keys are identical to those determined from the performance data.

On the other hand, if the answer to the question of the step S31 is negative (NO), i.e. if the key event is not a key-on event but a key-off event, the program proceeds to a step S36, where a key code corresponding to the key-off event is stored in the buffer KC, and then at a step S37, the key code KC and a signal indicative of the key-off event are delivered to the tone generator 14. At the following step S38, a key-off processing, described in detail hereinbelow, is executed, followed by termination of the subroutine.

Figure 7:
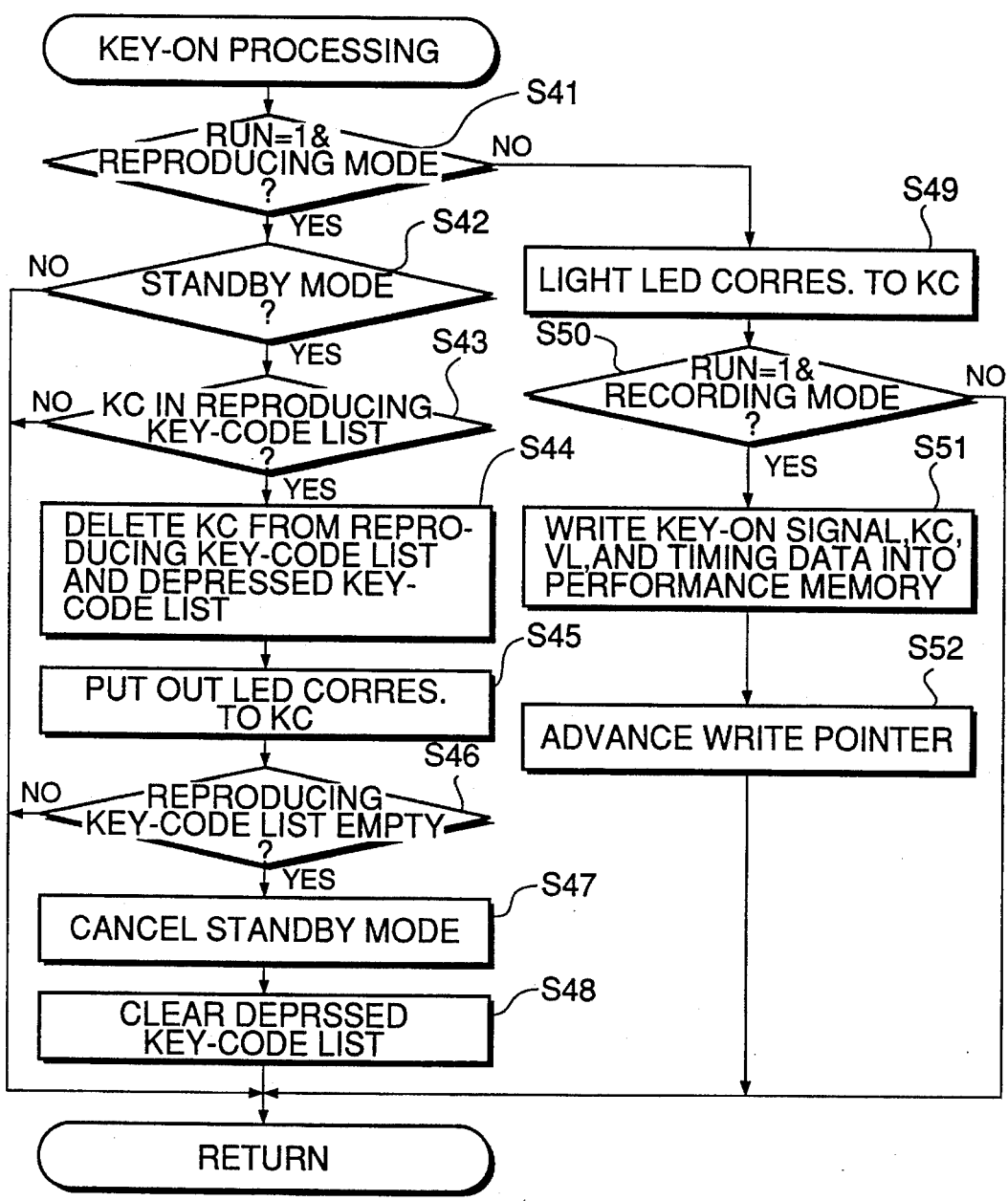
FIG. 7 is a flowchart showing a subroutine for a key-on processing executed at a step S35 of the FIG. 6 subroutine.

FIG. 7 shows a subroutine for carrying out the key-on processing executed at the step S35 of the FIG. 6 subroutine.

First, at a step S41, it is determined whether or not the flag RUN is equal to "1" and at the same time the instrument is in the reproducing mode, i.e. whether or not the instrument is operating in the reproducing mode. If the answer is affirmative (YES), it is determined at a step S42 whether or not the instrument is in the standby mode. If the answer to this question is affirmative (YES), it is determined at a step S43 whether or not there is any key code in the reproducing key code list, which corresponds to the key code KC newly entered into the depressed key-code list. If the answer is affirmative (YES), the key code KC is deleted from the reproducing key-code list and the depressed key code list, and then at a step S45, the LED corresponding to the key code KC is put out. That is, the electronic musical instrument according to the invention is constructed such that LED's for keys corresponding to key codes entered in the reproducing key code list are lighted, and when the player depresses a key for which a corresponding LED is lighted, the lighted LED is put out.

At the next step S46, it is determined whether or not the reproducing key code list is empty. If the answer to this question is affirmative (YES), the standby mode is cancelled, and at a step S48, the depressed key code list is cleared, followed by termination of the program.

On the other hand, if the answer to the question of the step S42 is negative (NO), i.e. if the instrument is not in the standby mode, or if the answer to the question of the step S43 is negative (NO), i.e. if there is no key code in the reproducing key code list, which corresponds to the key code KC newly entered into the depressed key-code list, or if the answer-to the question of the step S46 is negative (NO), i.e. if the reproducing key-code list is not empty, subsequent processings are skipped over, followed by termination of the subroutine.

On the other hand, if the answer to the question of the step S41 is negative (NO), i.e. if the instrument is not in the reproducing mode, an LED corresponding to the key code is lighted at a step S49. That is, if the instrument is not in the reproducing mode, it is either in the normal mode or in the recording mode, and therefore, if any key is depressed in the normal mode or the recording mode, an LED corresponding to the depressed key is lighted.

At the following step S50, it is determined whether or not the flag RUN is equal to "1" and at the same time the instrument is in the recording mode, that is, whether or not the instrument is operating in the recording mode. If the answer to this question is affirmative (YES), the program proceeds to a step S51, where the key-on signal, key code KC, velocity VL as well as timing data are written into the performance memory 13. Then at a step S52, the write pointer is advanced, followed by termination of the subroutine. In short, when the recording operation is in process, data indicative of states of performance (depressed key code, etc) are written into the performance memory 13 in the order operated by the player.

On the other hand, if the answer to the question of the step S50 is negative (NO), i.e. if the instrument is not operating in the recording mode, the stems S51 and S52 are skipped over, followed by termination of the program.

Figure 8:
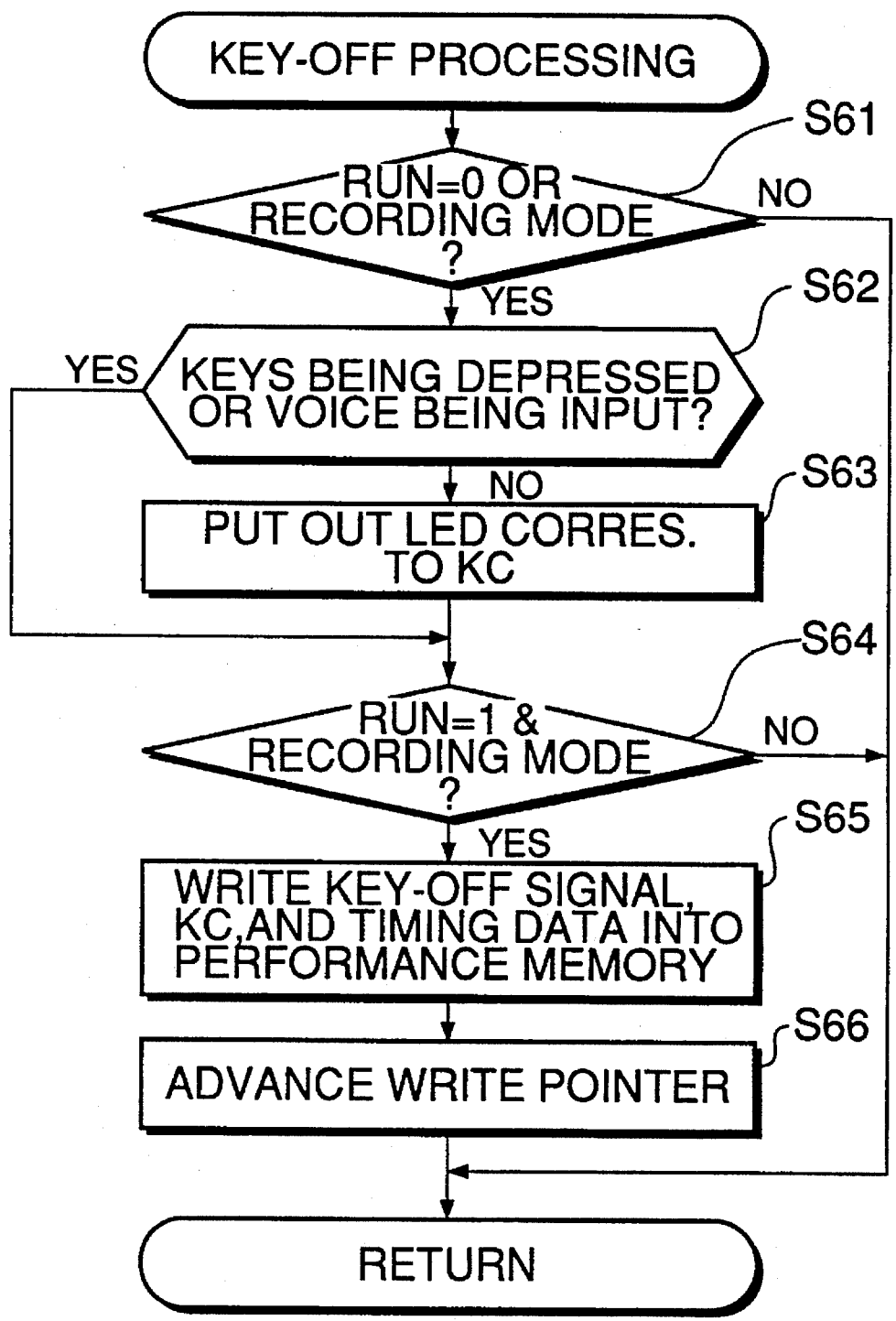
FIG. 8 is a flowchart showing a subroutine for a key-off processing executed at a step S38 of the FIG. 6 subroutine.

FIG. 8 shows a subroutine for carrying out the key-off processing executed at the step S38 of the FIG. 6 routine.

First, at a step S61, it is determined whether or not the flag RUN is equal to "0" or the instrument is in the recording mode. If the answer to this question is affirmative (YES), the program proceeds to a step S62, where it is determined whether or not any key is in a depressed state or a voice is being input. If the answer to this question is negative (NO), the program proceeds to a step S63, where an LED corresponding to the key code determined based on the depressed key or the input voice is put out. That is, the program proceeds to the step S63 only when inputting of information on depressed keys or voice ceases to occur after LED's have been lighted by the inputting of the information, and the present embodiment is constructed such that the lighted LED's are put out on such an occasion, to prevent the display from giving a false impression that the inputting of data by key depression or voice is continuing, if the LED's continue to be lighted. Then, the program proceeds to a step S64.

On the other hand, if the answer to the question of the step S61 is negative (NO), the present subroutine is immediately terminated, while if the answer to the question of the step S62 is affirmative (YES), the program proceeds to the step S64.

At the step S64, it is determined whether or not the flag RUN is equal to "1" and at the same time the instrument is in the recording mode, i.e. if the instrument is operating in the recording mode. If the answer to this question is affirmative (YES), the program proceeds to a step S65, where the key-off signal, key code KC as well as timing data are written into the performance memory 13, and at a step S66, the write pointer is advanced, followed by termination of the subroutine. On the other hand, if the answer to the question of the step S64 is negative (NO), the steps S65 and S66 are skipped over, followed by terminating the program.

Figure 9:
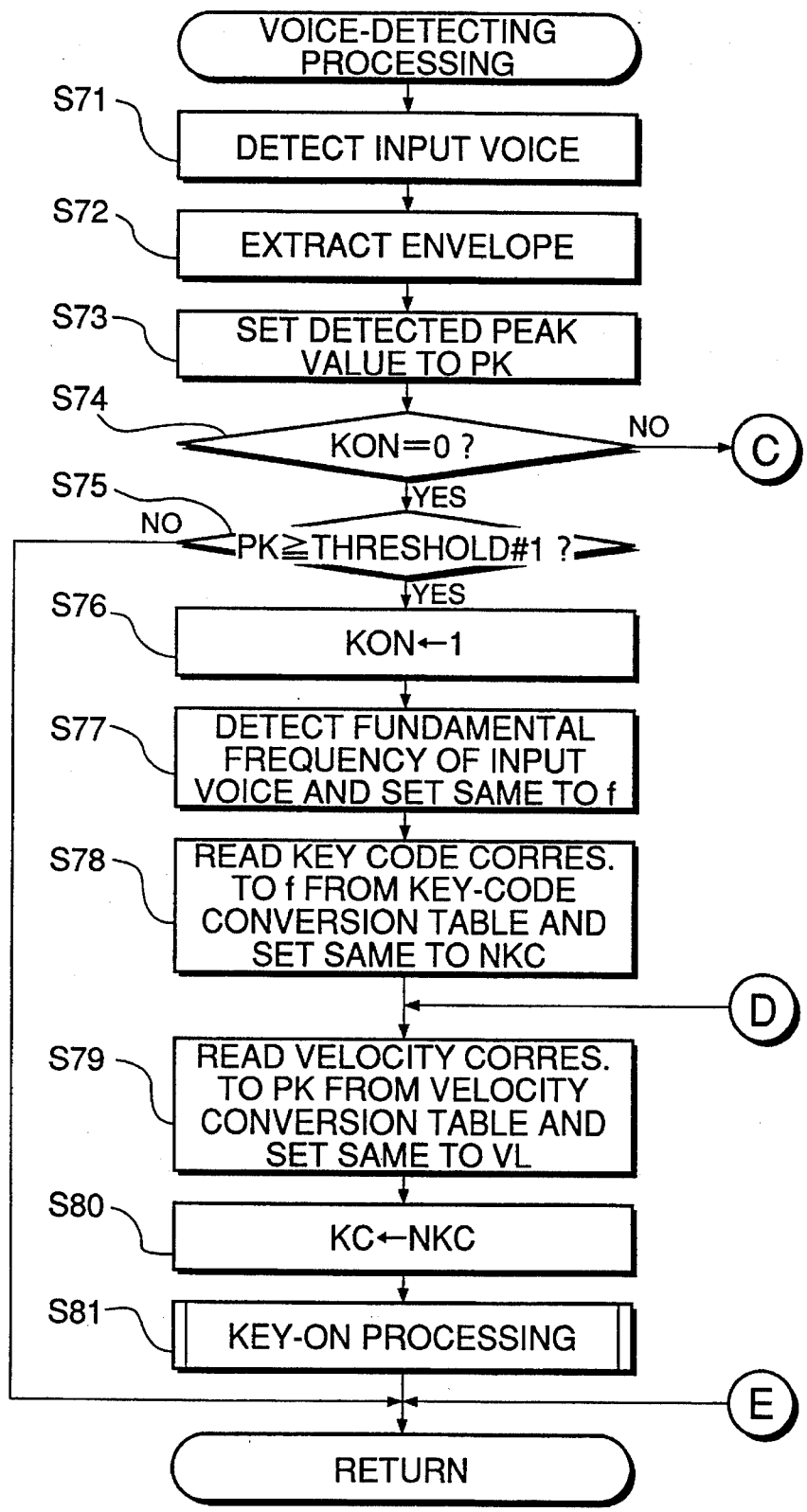
FIG. 9 is a flowchart showing a subroutine for a voice-detecting processing executed in the FIG. 4 main routine.
Figure 10:
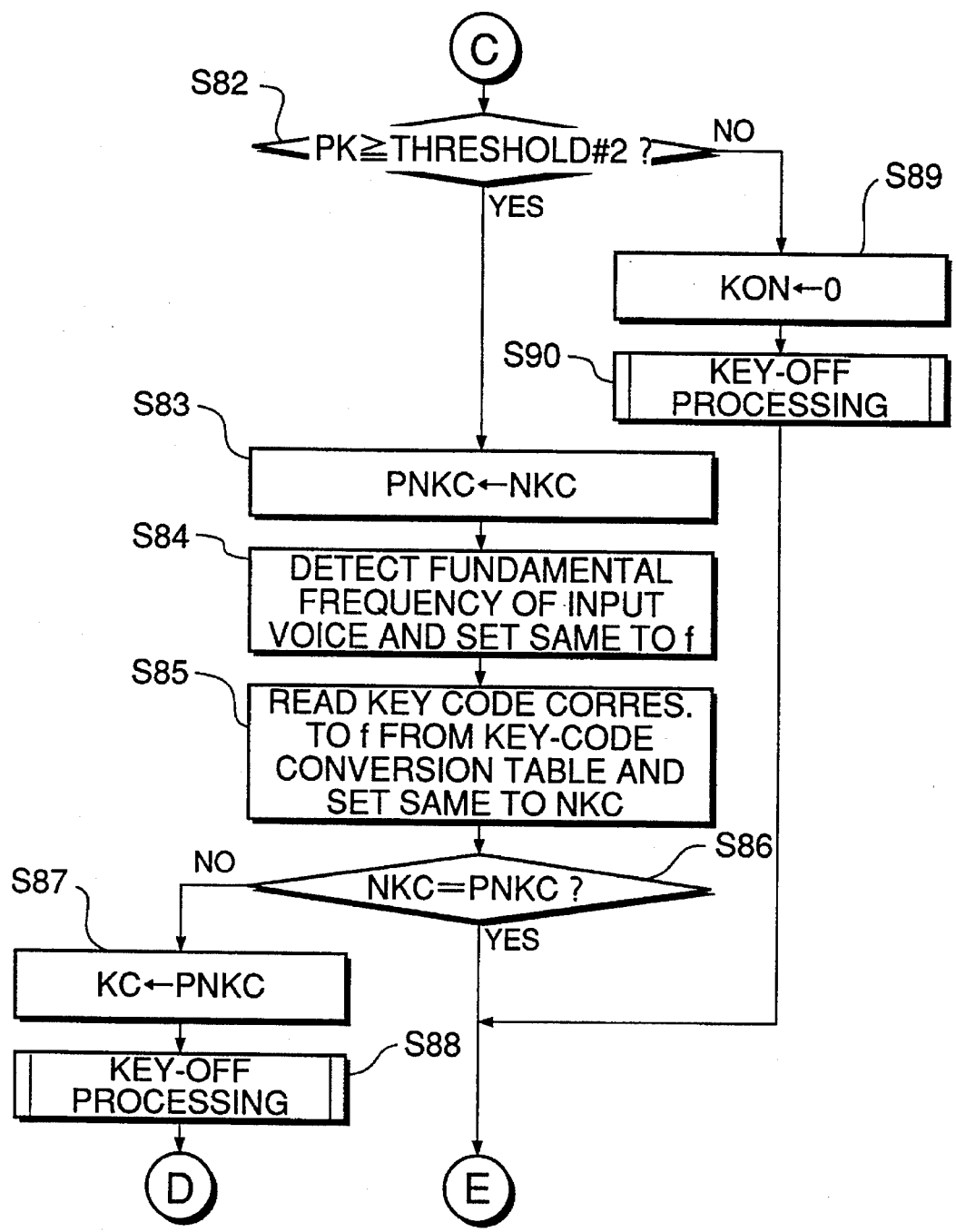
FIG. 10 is a flowchart showing a continuation of the FIG. 9 subroutine.

FIG. 9 and FIG. 10 show a subroutine for carrying out the voice-detecting processing executed at the step S4 of the FIG. 4 main routine.

In FIG. 9, first at a step S71, the input voice is detected by the input voice-inputting device 5 appearing in FIG. 1, and at a step S72, an envelope of the input voice is extracted. At a step S73, a peak value of the input voice signal is detected, and the detected peak value is stored into a buffer PK within the working memory 10 as breath pressure data. Then, at a step S74, it is determined whether or not a flag KON is equal to "0". The flag KON is set to "1" when a voice is input, and reset to "0", when no voice is input.

If the answer to the question of the step S74 is affirmative (YES), i.e. if the flag KON is equal to "0", the program proceeds to a step S75, where it is determined whether or not the peak value PK exceeds a first threshold value (hereinafter referred to as "the threshold #1"). If the answer to this question is affirmative (YES), it is judged that a voice has been input, and the program proceeds to a step S76, where the flag KON is set to "1", and then the program proceeds to a step S77, where the fundamental frequency of the input voice is detected and stored into a buffer f within the working memory 10.

Then, at a step S78, a key code corresponding to the frequency f is read out from the key-code conversion table shown in FIG. 2 and stored into a buffer NKC within the working memory 10. At the following step S79, a value of velocity corresponding to the peak value PK is read out from the velocity conversion table shown in FIG. 3 and stored into a buffer VL of the working memory 10. That is, the CPU 8 determines a key code from the pitch of the input voice, and a value of velocity from the breath pressure. At the following step S80, the data stored in the buffer KC is updated by the key code from the buffer NKC, and at a step S81, the key-on processing subroutine described above with reference to FIG. 7 is executed, followed by termination of the subroutine.

On the other hand, if the answer to the question of the step S75 is negative (NO), i.e. if the peak value PK is below the threshold #1, it is judged that no voice has been input, followed by termination of the subroutine.

If the answer to the question of the step S74 is negative (NO), i.e. if the flag KON is equal to "1", the program proceeds to a step S82, where it is determined whether or not the peak value PK exceeds a second threshold value (hereinafter referred to as "the threshold #2"). If the answer to this question is affirmative (YES), the program proceeds to a step S83, where the key code stored in the buffer NKC is stored into a buffer PNKC, and then, at a step S84, similarly to the step S77, the fundamental frequency of the input voice is detected and stored into the buffer f. At a step S85, similarly to the step S78, the key-code conversion processing is executed, and the key code read out is stored into the buffer NKC.

Then, at a step S86, the key code PNKC, i.e. the immediately preceding key code obtained before reading-out by the steps S84 and S85 is compared with the key code NKC updated by the reading-out to determine whether or not they are identical to each other. If they are not identical to each other, the program proceeds to a step S87, where the key code stored in the buffer KC is updated by the key code in the buffer PNKC, and at a step S88, the key-off processing described with reference to FIG. 8 is executed. Then, the program proceeds to the step S79 to S81, where the key-inputting processing described above is executed, followed by terminating the subroutine. In short, the determination at the step S86 is carried out in order to determine whether or not the player has changed the pitch of his or her voice while he or she is uttering the voice. If the player has changed the pitch, the input processing of the voice generated in the immediately preceding loop is stopped, and a new voice changed in pitch is input for processing.

If the answer to the question of the step S86 is affirmative (YES), i.e. if the key code in the buffer PNKC is identical to the key code in the buffer NKC, the present subroutine is immediately terminated.

Further, if the answer to the question of the step S82 is negative (NO), i.e. if the peak value PK is below the threshold #2, it is regarded that the input of the voice has been terminated, and the flag KON is reset at a step S89. Then, the key-off processing subroutine shown in FIG. 8 is executed at a step S90, followed by termination of the subroutine.

Figure 11:
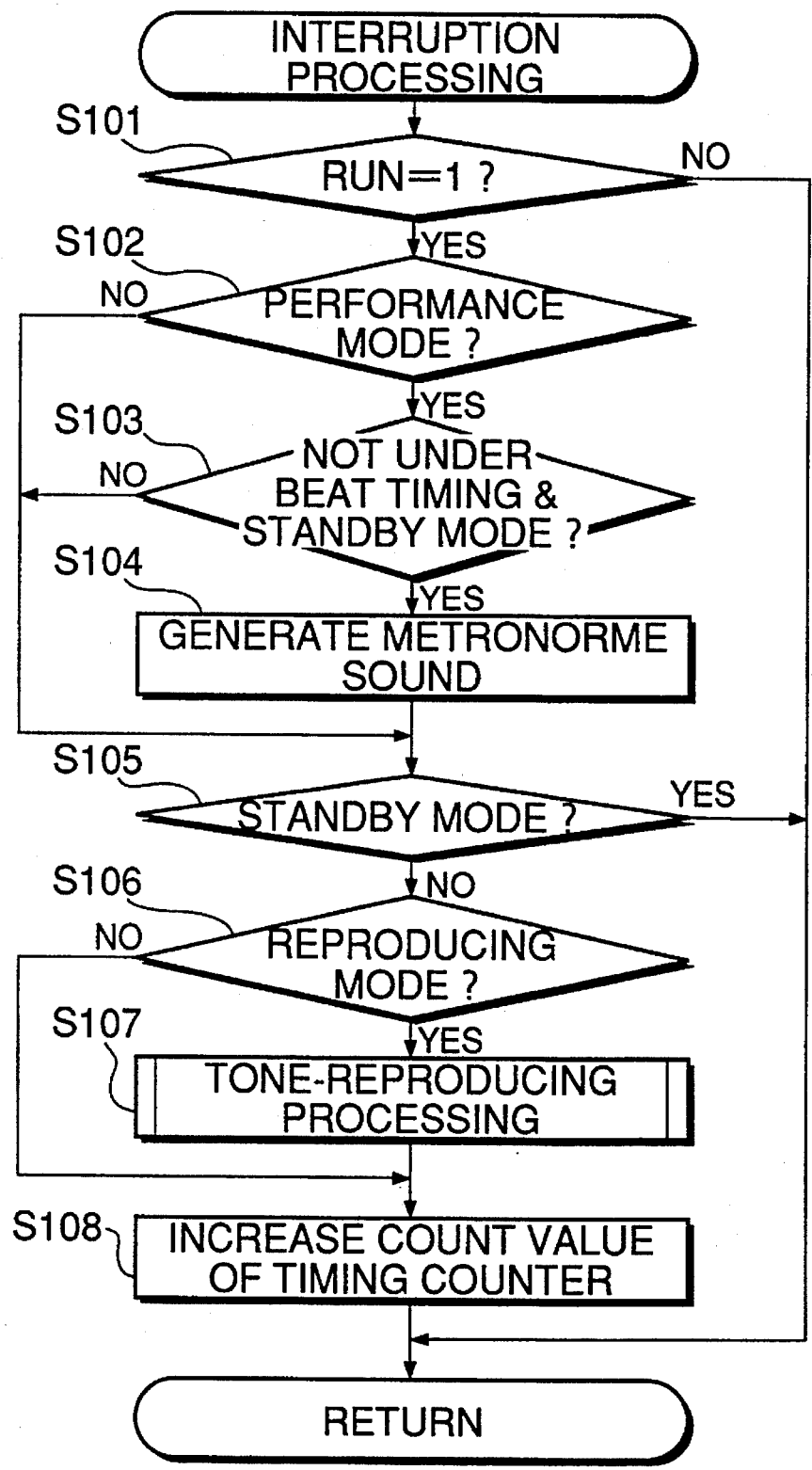
FIG. 11 is a flowchart showing a routine for an interruption processing.

FIG. 11 shows an interruption processing program. The interruption request is made by the timer 15 appearing in FIG. 1 once per duration corresponding to a ninety-sixth note. In an example given below, it is assumed that the performance data stored in the performance memory for being read out consists of data for the performance part assigned to the player.

At a step S101, it is determined whether or not the flag RUN is equal to "1". If the answer to this question is affirmative (YES), the program proceeds to a step S102, where it is determined whether or not the instrument is in the performance mode. If the answer to this question is affirmative (YES), the program proceeds to a step S103, where it is determined whether or not the present loop corresponds to timing of a beat and at the same time the instrument is not in the standby mode. If the answer to this question is affirmative (YES), the program proceeds to a step S104, where a metronome sound is caused to be generated, followed by the program proceeding to a step S105. On the other hand, if the answer to the question of the step S102 is negative (NO), or if the answer to the question of the step S103 is negative (NO), program skips over the step S104 to the step S105. That is, in this example of the performance mode, LED's are lighted for the performance part of the player according to the performance data read out from the performance memory 13 and no musical tones of automatic performance are generated, and therefore, the metronome sound is generated at the timing of each beat.

At the step S105, it is determined whether or not the instrument is in the standby mode. If the answer to this question is negative (NO), the program proceeds to a step S106, where it is determined whether or not the instrument is in the reproducing mode. If the answer to this question is affirmative (YES), a tone-reproducing processing is executed at a step S107, and a timing counter is increased by an incremental value of 1 at a step S108, followed by terminating the present interruption processing. The timing counter is a software counter provided in the working memory 10, which is used for setting timing of delivering performance data read from the floppy disc 11 or the performance memory 13, to the tone generator 14, when the instrument is in the reproducing mode, whereas it is used for determining the timing of outputting the performance data (key codes, etc.) in preparing or recording the performance data as at the step S51 of the FIG. 7 routine.

On the other hand, if the answer to the question of the step S105 is affirmative (YES), i.e. if the instrument is in the standby mode, the interruption processing is immediately terminated, whereas if the answer to the question of the step S106 is negative (NO), i.e. if the instrument is not in the reproducing mode, the program skips over the step S107 to the step S108.

Further, if the answer to the question of the step S101 is negative (NO), i.e. if the flag RUN is equal to "0", the program is immediately terminated.

Figure 12:
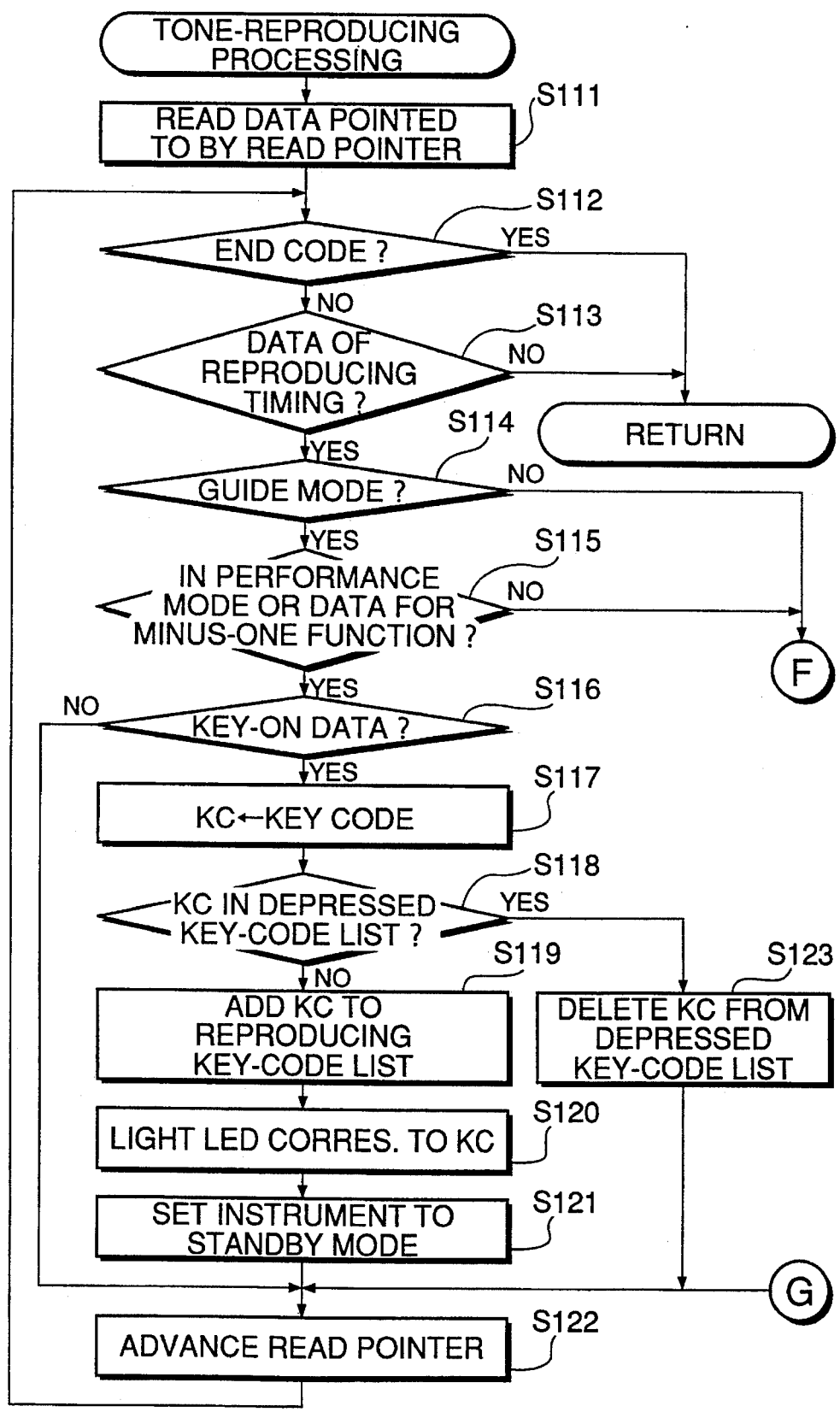
FIG. 12 is a flowchart showing a subroutine for a tone-reproducing processing executed at a step S107 of the FIG. 11 routine.
Figure 13:
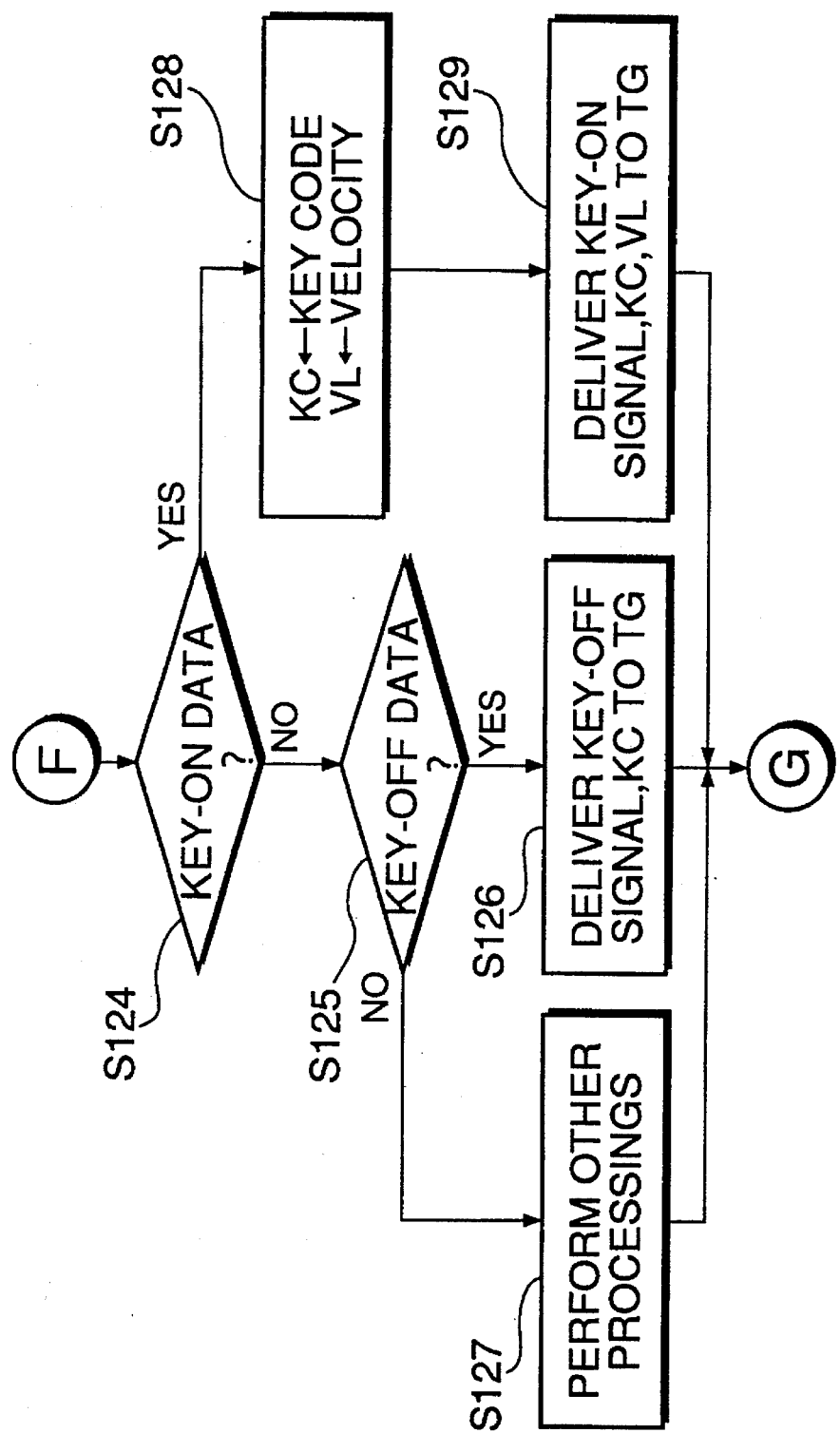
FIG. 13 is a flowchart showing a continuation of the FIG. 12 subroutine.

FIG. 12 and FIG. 13 show a subroutine for the tone-reproducing processing executed at the step S107 of the FIG. 11 routine.

In FIG. 12, data pointed to by the read pointer is read out at a step Sill, and at a step S112, it is determined whether or not the data read out is end-code data. If the answer to this question is negative (NO), the program proceeds to a step S113, where it is determined whether or not the data read out designates proper reproducing timing, i.e. whether or not reproducing timing designated by the data read out agrees with data (count value) of the timing counter. If the answer to this question is negative (NO), the subroutine is immediately terminated.

Further, if the answer to the question of the step S112 is affirmative (YES), i.e. if the data read out is end-code data, the program is immediately terminated.

On the other hand, if the answer to the question of the step S113 is affirmative (YES), the program proceeds to a step S114, where it is determined whether or not the instrument is operating in the guide mode. If the answer to this question is affirmative (YES), the program proceeds to a step S115, where it is determined whether or not the instrument is operating in the performance mode, or the data read out is one for the minus-one function. If the answer to this question is affirmative (YES), the program proceeds to a step S116, where it is determined whether or not the data read out is key-on data. These steps are provided to cause LED's to be lighted in a manner correspondent to the performance data of the piece of music read out, when the instrument is in the guide mode and at the same time the instrument is in the performance mode or the data read out is for the minus-one function.

If the answer to the question of the step S116 is affirmative (YES), i.e. the data read out is key-on data, the program proceeds to a step S117, where the key-code data stored subsequent to the key-on data is stored into the buffer KC, and at the following step S118, it is determined whether or not a key code KC indicated by the key-code data has been registered in the depressed key-code list. If the answer to this question is negative (NO), the program proceeds to a step S119, where the key code KC is registered into the reproducing key code list. Then, at a step S120, the LED corresponding to the key code KC is lighted, and at a step S121, the instrument is set to the standby mode. At the following step S122, the read pointer is advanced to the following item of performance data, followed by the program returning to the step S112.

If the answer to the question of the step S118 is affirmative (YES), i.e. if the key code KC has already been registered in the depressed key code list, the program proceeds to a step S123, where the key code KC is deleted from the depressed-key code list, and then the program proceeds to the step S122. More specifically, the determination at the step S118 is for performing the tone-reproducing processing even when the player depresses a key code corresponding to the performance data to be read out before LED's are lighted. In such a case, neither the LED is lighted nor the standby mode starts, but the performance is regarded to follow the guide, and the subsequent performance data starts to be processed by carrying out the following step S122.

On the other hand, if the answer to the question of the step S116 is negative (NO), i.e. the data read out is not key-on data, the program skips over the steps S117 to S121 to the step S122.

Further, if the answer to the question of the step S114 is negative (NO), or if the answer to the question of the step S115 is negative (NO), the program proceeds to a step S124, where it is determined whether or not the data read out is key-on data. That is, the program proceeds to the step S124 when the tone generator is delivering a signal of a musical tone or should start delivering a signal of a musical tone.

If the answer to the question of the step S124 is negative (NO), the program proceeds to a step S125, where it is determined whether or not the data is key-off data. If the answer to this question is affirmative (YES), i.e. if the tone generator 14 is delivering a signal of a musical tone, the program proceeds to a step S126, where a key-off signal and a key-off code KC are delivered to the tone generator 14, and then the program proceeds to the step S122. If the answer to the question of the step S125 is negative (NO), i.e. if the data read out is not key-off data, the program proceeds to a step S127, where another processing, e.g. a processing on tone color data, is carried out, followed by the program proceeding to the step S122.

On the other hand, if the answer to the question of the step S124 is affirmative (YES), i.e. if the tone generator 14 should start delivering the signal of a musical tone, the program proceeds to a step S128, where a key code is stored into the buffer KC, and a value of velocity is stored into the buffer VL, and then the program proceeds to a step S129. At the step S129, a key-on signal, a key-code KC, and a velocity value VL are delivered to the tone generator 14, followed by the program proceeding to the step S122.

As described above, according to the present embodiment, when the musical instrument is in the guide mode, even if the player cannot depress keys corresponding to those indicated by the lighted LED's due to his lack of skill, for example, he can proceed with the performance by uttering a voice having a pitch corresponding to the musical tone to be generated, thereby cancelling the standby mode. This enables the player to enjoy his performance without frequently stopping the automatic performance or prolonging the wait state for the automatic performance. Further, in the recoding mode, if data of depressed keys or a voice ceases to be input, LED's lighted by preceding operations of the player are put out, which enables the player to accurately recognize whether or not there is any data input by action of the player.

Figure 14:
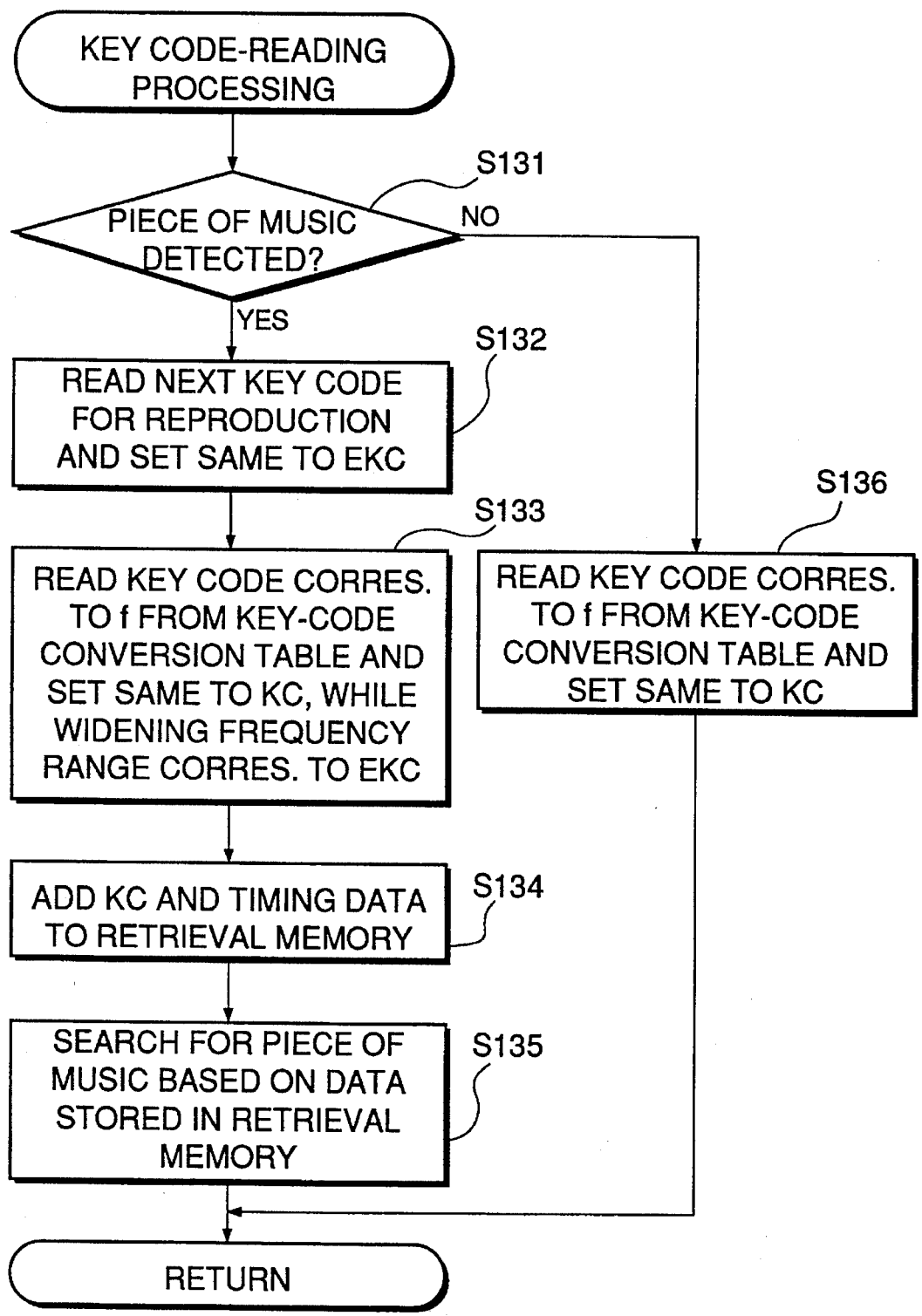
FIG. 14 is a flowchart showing a routine for key code-reading processing according to the second embodiment.

FIG. 14 shows a routine for executing processings by an electronic musical instrument having a voice-inputting function according to a second embodiment of the invention.

This embodiment is distinguished from the first embodiment in a manner of determining a key code by converting a signal of an input voice into a frequency indicative of a pitch of the voice. That is, according to the present embodiment, data of a piece of music for performance is retrieved based on information of the piece of music being played by the player and cumulatively stored in a retrieval memory provided as part of the working memory 10, whereby the frequency of a voice, which corresponds to a key code to be input after the present key code, is expected, to thereby facilitate the key-code conversion. As the method of retrieving the performance data of a piece of music being played by the player, a method may be employed, which is described in Japanese Provisional Patent Publication (Kokai) No. 1-309087 assigned to the present assignee and included herein with reference thereto.

Figure 15:
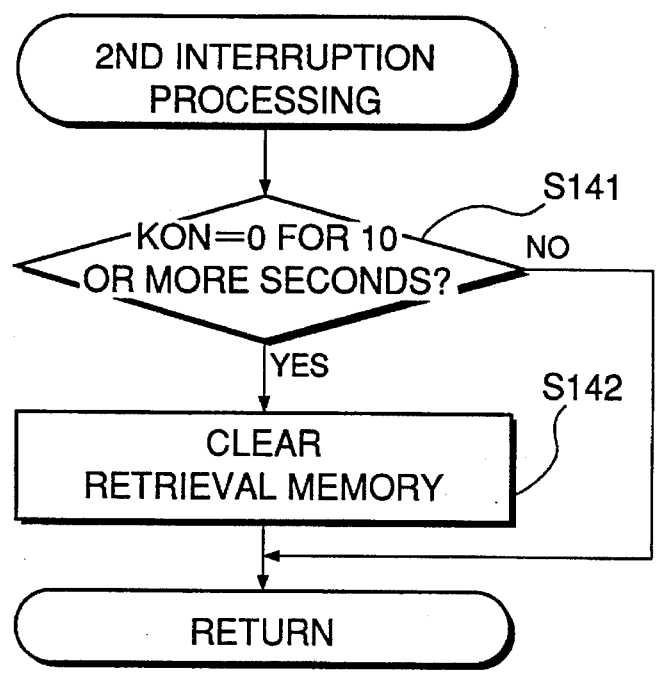
FIG. 15 is a flowchart showing a subroutine for a second interruption processing according to the second embodiment.

Further, the routines used in the present embodiment are identical to those described hereinabove, except that the step S78 in FIG. 9 and the step S85 in FIG. 10 are replaced by a subroutine shown in FIG. 14, and a second interruption processing routine shown in FIG. 15 is additionally provided.

In the FIG. 14 routine, it is first determined at a step S131 whether or not there is any detected piece of music (expected music piece). More specifically, as described in detail hereinbelow, the name of a piece of music being played (expected music piece) is searched for based on data stored in the retrieval memory, and if the expected music piece is detected, a flag, for example, may be set to inform the CPU of presence of the detected piece of music.

If the answer to the question of the step S131 is affirmative (YES), i.e. if it is determined that the expected music piece being played has been detected, a key code corresponding to a musical tone to be reproduced immediately after the present musical tone being reproduced is read out and stored into an expected key-code buffer EKC. At a step S133, with reference to the key-code conversion table 6 appearing in FIG. 1, a key code corresponding to the fundamental frequency f of an input voice determined by the step S78 in FIG. 9 or the step S85 in FIG. 10 is read out and stored into the buffer KC. In effecting this, the upper limit of the frequency is raised and the lower limit of same is lowered according to the expected key code EKC, to widen a frequency range corresponding to a key code to be read from the key-code conversion table 6 appearing in FIG. 1, thereby facilitating determination of the key code KC by the input voice.

Then, at the step S134, the key code KC is stored into the retrieval memory together with the timing data, thereby increasing an amount of information for use in searching for the expected music piece being played. At the following step S135, the expected music piece is updated, by searching for the expected music piece being given, based on data stored in the retrieval memory, thereby enhancing the accuracy of the expected music piece being played, followed by terminating the present routine.

On the other hand, if the answer to the question of the step S131 is negative (NO), i.e. if it is determined that there is no detected piece of music, the program proceeds to a step S136, where a key code KC is determined by a processing similar to that described in the step S78 in FIG. 9 and the step S85 in FIG. 10.

FIG. 15 shows the second interruption routine, by which each interruption request is made to the CPU, once per second, based on output from the timer 15 appearing in FIG. 15.

First, at a step S141, it is determined whether or not the flag KON continues to be equal to "0" for 10 seconds or a longer time period. If the answer to this question is affirmative (YES), the program proceeds to a step S142, where the retrieval memory is cleared, followed by terminating the present interruption routine, whereas if the answer is negative (NO), the present interruption is immediately terminated. That is, if no voice data continues to be input for 10 seconds or longer, the contents of the retrieval memory are cleared to stop the retrieval of the expected music piece, so that retrieval of the expected music piece can start based on the voice information input thereafter.

By virtue of the above construction, the second embodiment can easily perform the key-code conversion by expecting each key code of a piece of music for performance.

Figure 16:
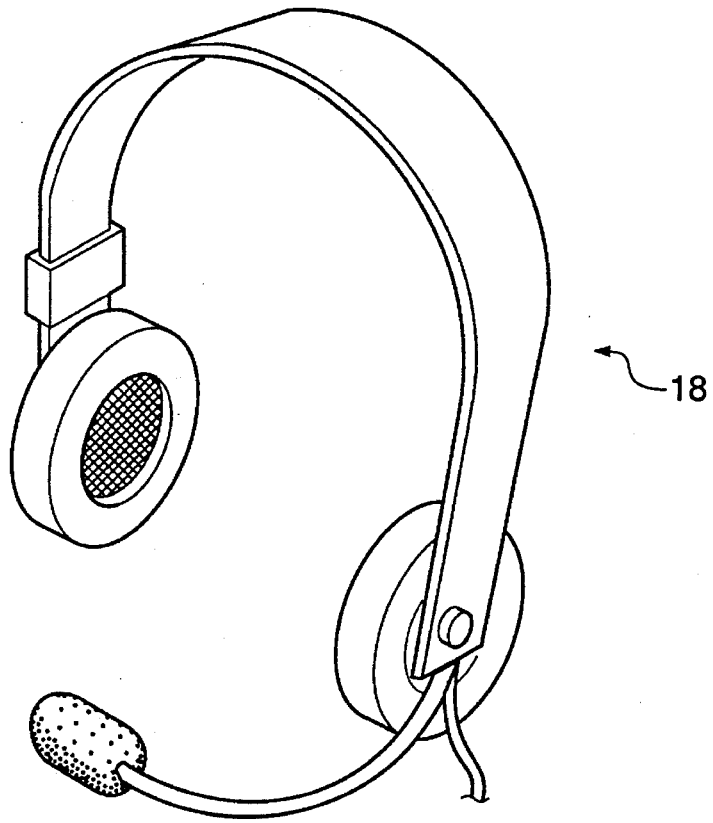
FIG. 16 is a diagram showing another example of a voice input device.

Although, in the above embodiments, the hand microphone 4 is used, this is not limitative, but there may be used any means capable of inputting voices to the electronic musical instrument, such as a head-phone equipped with a microphone as shown in FIG. 16. Further, although description has been made of an electronic keyboard instrument by way of an example of the electronic musical instrument, this is not limitative, but the present invention is effectively applicable to other electronic musical instruments, such as an electronic string instrument.

What is claimed is:

1. An electronic musical instrument having a voice-inputting function, comprising:

voice information-inputting means for inputting voice information;

performance information-inputting means for inputting performance information;

performance data-storing means for storing performance data;

readout means for sequentially reading out each item of said performance data stored in said performance data-storing means;

comparing means for comparing at least one of said voice information input by said voice information-inputting means and said performance information input by said performance information-inputting means with each item of said performance data read out by said readout means from said performance data-storing means; and readout-directing means for directing said readout means to read out a next item of said performance data, when said comparing means determines that at least one of said voice information and said performance information agrees with said item of performance data read out by said readout means.

2. An electronic musical instrument according to claim 1, including a plurality of display means for providing a visual indication to a performer, each of each of said plurality of display means being lighted based on a corresponding item of said performance data read out by said readout means, and is put out when said comparing means determines that at least one of said voice information and said performance information agrees with said corresponding item of performance data read out by said readout means.

3. An electronic musical instrument according to claim 1, wherein said voice information-inputting means includes voice-inputting means for inputting voice data and pitch information-determining means for determining pitch information based on said voice data input by said voice-inputting means.

4. An electronic musical instrument according to claim 2, wherein said voice information-inputting means includes voice-inputting means for inputting voice data and pitch information-determining means for determining pitch information based on said voice data input by said voice-inputting means.

5. An electronic musical instrument according to claim 3, where said pitch information-determining means determines said pitch information by use of a table formed by predetermined ranges of fundamental frequencies of voices and pitch names respectively corresponding thereto.

6. An electronic musical instrument according to claim 4, where said pitch information-determining means determines said pitch information by use of a table formed by predetermined ranges of fundamental frequencies of voices and pitch names respectively corresponding thereto.

7. An electronic musical instrument according to claim 5, including pitch information-storing means for storing said pitch information, wherein said performance data-storing means stores data of a plurality of music pieces for performance, and wherein said pitch information-determining means detects identity between a music piece being given by said player and one of said plurality of music pieces stored in said performance data-storing means, and determines said pitch information based on data of said one of said plurality of music pieces.

8. An electronic musical instrument according to claim 6, including pitch information-storing means for storing said pitch information, wherein said performance data-storing means stores data of a plurality of music pieces for performance, and wherein said pitch information-determining means detects identity between a music piece being given by said player and one of said plurality of music pieces stored in said performance data-storing means, and determines said pitch information based on data of said one of said plurality of music pieces.

9. An electronic musical instrument according to claim 7, wherein said pitch information-determining means widens a predetermined range of a fundamental frequency of at least a portion of said input voice data based on said performance data of said one of said plurality of music pieces for which identity with said music piece being given by said player has been detected.

10. An electronic musical instrument according to claim 8, wherein said pitch information-determining means widens a predetermined range of a fundamental frequency of at least a portion of said input voice data based on said performance data of said one of said plurality of music pieces for which identity with said music piece being given by said player has been detected.

11. An electronic musical instrument having a voice-inputting function, comprising:

voice-inputting means for inputting a voice;

performance information-inputting means for inputting performance information, said performance information-inputting means having a plurality of operating elements for performance;

a plurality of display devices provided for respective ones of said plurality of operating elements of said performance information-inputting means;

determining means for determining whether or not said voice has been input by said voice-inputting means;

detecting means for detecting a pitch name of said voice input by said voice-inputting means; and control means for controlling said plurality of display devices such that when said determining means has determined that said voice has been input, one of said plurality of display devices corresponding to one of said plurality of operating elements is lighted, which corresponds to said pitch name of said voice detected by said detecting means, and that when said determining means has determined that said voice has not been input any longer, said one of said plurality of display devices lighted is put out.

12. An electronic musical instrument according to claim 11, wherein said determining means detects a peak value of said voice input by said voice-inputting means, and determines that said voice has been input when said peak value is larger than a first predetermined reference value.

13. An electronic musical instrument according to claim 12, wherein said determining means determines that a second voice has been input by said voice-inputting means, when a peak value of a voice input after said determining means has determined that said voice had said peak value which was larger than said first predetermined reference value, is larger than a second predetermined reference value, and said detecting means changes said pitch name based on said second voice input by said voice-inputting means.

14. An electronic musical instrument having a voice-inputting function, comprising:

a plurality of operating elements for performance;

notifying means for notifying a player of one of said plurality of operating elements to be operated;

voice information-inputting means for inputting voice information;

storage means for sequentially storing said voice information input by said voice information-inputting means;

readout means for sequentially reading out said voice information stored in said storage means; and control means for causing said notifying means to notify said player of said one of said plurality of operating elements to be operated, which corresponds to an item of said voice information read out from said storage means.

15. An electronic musical instrument according to claim 14, including changeover means for effecting changeover between a recording mode in which said voice information is sequentially stored into said storage means and a reproducing mode in which said voice information stored in said storage means is sequentially read out.

16. An electronic musical instrument having a voice-inputting function, comprising:

voice information-inputting means for inputting voice information;

storage means for sequentially storing said voice information input by said voice information-inputting means;

readout means for sequentially reading out said voice information stored in said storage means;

pitch information-inputting means for inputting pitch information of a musical tone for performance;

comparing means for comparing an item of said voice information read out by said readout means with an item of said pitch information input by said pitch information-inputting means; and control means for causing said readout means to read out a next item of said voice information stored in said storage means, when said item of said voice information agrees with said item of said pitch information input by said pitch information-inputting means.

17. An electronic musical instrument according to claim 16, including changeover means for effecting changeover between a recording mode in which said voice information is sequentially stored into said storage means and a reproducing mode in which said voice information stored in said storage means is sequentially read out and said voice information newly input by said voice information-inputting means is used as said pitch information.

* * * * *